(12) United States Patent
Orlov

(10) Patent No.: US 9,919,366 B2
(45) Date of Patent: Mar. 20, 2018

(54) CUTTING INSERT AND A TOOL HOLDER WITH A SEAT FOR CUTTING INSERT

(71) Applicant: Vargus Ltd., Nahariya (IL)

(72) Inventor: Alexander Orlov, Nahariya (IL)

(73) Assignee: VARGUS Ltd., Nahariya (IL)

( * ) Notice: Subject to any disclaimer, the term of this patent is extended or adjusted under 35 U.S.C. 154(b) by 601 days.

(21) Appl. No.: 14/311,262

(22) Filed: Jun. 21, 2014

(65) Prior Publication Data

US 2015/0003922 A1    Jan. 1, 2015

(30) Foreign Application Priority Data

Jun. 26, 2013    (EP) ..................................... 13173859

(51) Int. Cl.
| | |
|---|---|
| B23C 5/06 | (2006.01) |
| B23C 5/20 | (2006.01) |
| B23C 5/10 | (2006.01) |
| B23C 5/22 | (2006.01) |

(52) U.S. Cl.
CPC ................ B23C 5/10 (2013.01); B23C 5/109 (2013.01); B23C 5/1054 (2013.01); B23C 5/2213 (2013.01); B23C 2200/0466 (2013.01); B23C 2200/121 (2013.01); B23C 2200/367 (2013.01); B23C 2210/02 (2013.01); B23C 2210/03 (2013.01); B23C 2210/168 (2013.01); B23C 2210/205 (2013.01); B23C 2220/36 (2013.01); Y10T 407/1924 (2015.01); Y10T 407/1946 (2015.01)

(58) Field of Classification Search
CPC .......... B23C 2210/02; B23C 2200/121; B23C 2210/03; B23C 5/109
See application file for complete search history.

(56) References Cited

U.S. PATENT DOCUMENTS 349,475 A * 9/1886 Barclay ................. B23B 27/083
                                                        407/113
2,460,673 A * 2/1949 Berscheid ............. E21B 17/046
                                                        175/419

(Continued)

FOREIGN PATENT DOCUMENTS

DE    10 2004 023 710 A1    12/2005
DE       102004023710 A1 * 12/2005 ........... B23C 5/1054

OTHER PUBLICATIONS

European Search Report issued in connection with EP 13 17 3859.

*Primary Examiner* — Sara Addisu
(74) *Attorney, Agent, or Firm* — Akerman LLP

(57) ABSTRACT

A cutting insert having a first coupling structure, a tool holder having a complementary second coupling structure with a seat for a milling tool system, and a milling tool system having a cutting insert and a holder are all described. The first coupling structure has a circular cylindrical element with a cylinder abutment surface, the circular cylindrical element projecting axially from a bottom surface of a central body and being arranged concentrically with respect to a central axis, A perpendicular abutment surface is arranged perpendicular to the central axis, and at least two ribs project axially from the bottom surface. Each rib has a contact area with a normal direction at least essentially perpendicular to the central axis for opposing a torque about the central axis.

15 Claims, 6 Drawing Sheets

(56) References Cited

U.S. PATENT DOCUMENTS

| | | | | |
|---|---|---|---|---|
| 5,139,371 | A * | 8/1992 | Kraft | B23B 27/164 407/101 |
| 6,109,152 | A | 8/2000 | Hecht | |
| 6,138,540 | A * | 10/2000 | Niemi | B23B 27/065 407/113 |
| 6,276,879 | B1 * | 8/2001 | Hecht | B23B 31/008 279/93 |
| 7,112,021 | B2 * | 9/2006 | Pantzar | B23B 31/11 279/8 |
| 7,121,771 | B2 * | 10/2006 | Englund | B23B 27/1622 407/103 |
| 7,150,590 | B2 * | 12/2006 | Schafer | B23B 27/007 407/40 |
| 7,153,066 | B2 | 12/2006 | Schafer et al. | |
| 7,325,471 | B2 * | 2/2008 | Massa | B23B 27/12 279/8 |
| 8,042,437 | B2 * | 10/2011 | Maier | B23B 29/043 408/226 |
| 8,734,069 | B2 * | 5/2014 | Abe | B23B 27/1614 407/11 |
| 9,352,402 | B2 * | 5/2016 | Luik | B23C 5/109 |
| 9,475,132 | B2 * | 10/2016 | Kocherovsky | B23B 29/02 |
| 9,669,478 | B2 * | 6/2017 | Burtscher | B23B 31/005 |
| 2003/0210963 | A1 * | 11/2003 | Kakai | B23B 31/008 408/231 |
| 2004/0067112 | A1 * | 4/2004 | Blucher | B23B 27/007 407/103 |
| 2005/0047885 | A1 * | 3/2005 | Hyatt | B23B 1/00 409/132 |
| 2008/0232909 | A1 * | 9/2008 | Filho | B23B 1/00 407/7 |
| 2009/0123244 | A1 * | 5/2009 | Buettiker | B23B 31/1107 408/233 |
| 2011/0200408 | A1 | 8/2011 | Hecht | |
| 2012/0039676 | A1 * | 2/2012 | Marshansky | B23C 5/1054 407/48 |
| 2014/0294528 | A1 * | 10/2014 | Azegami | B23C 5/10 408/200 |

* cited by examiner

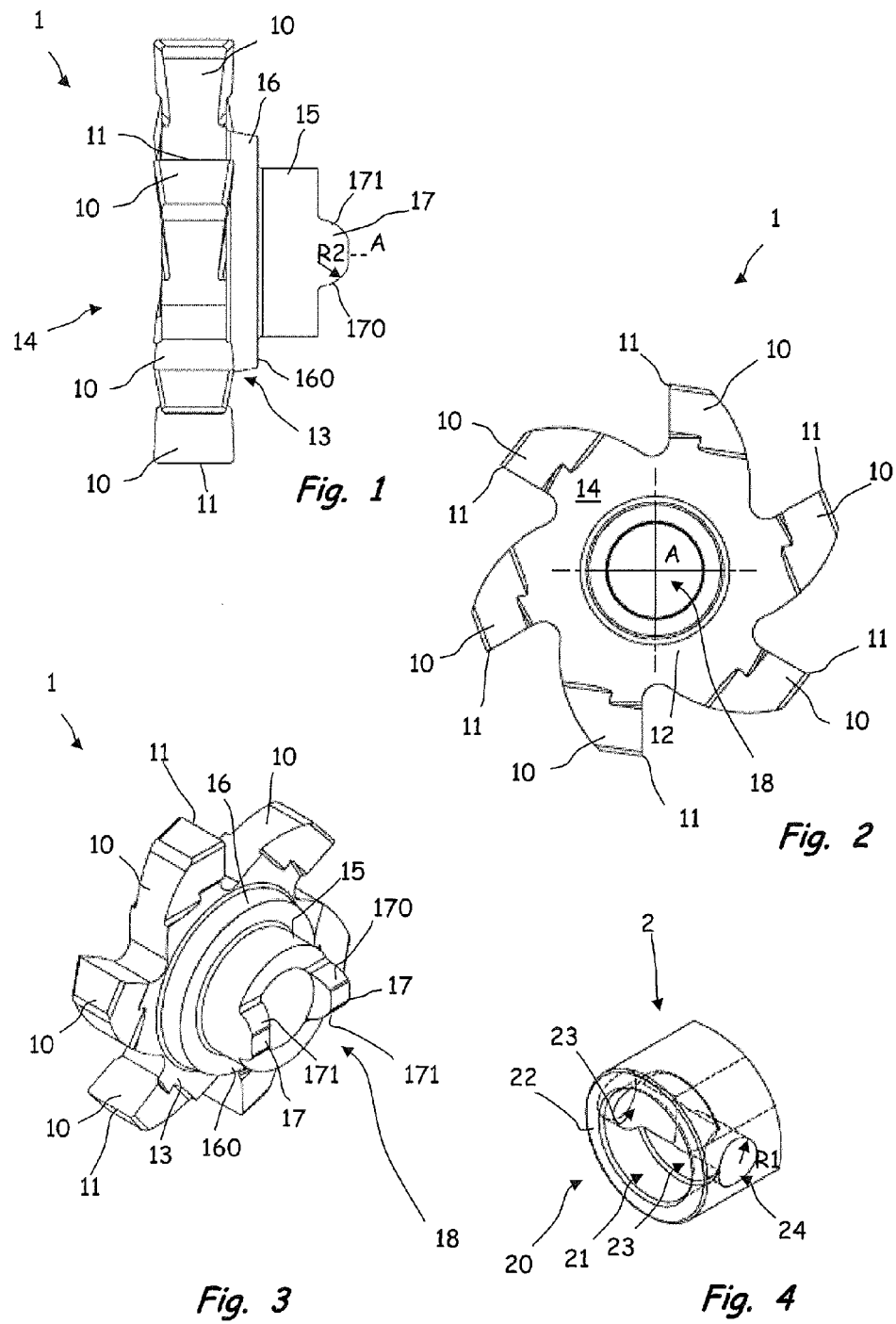

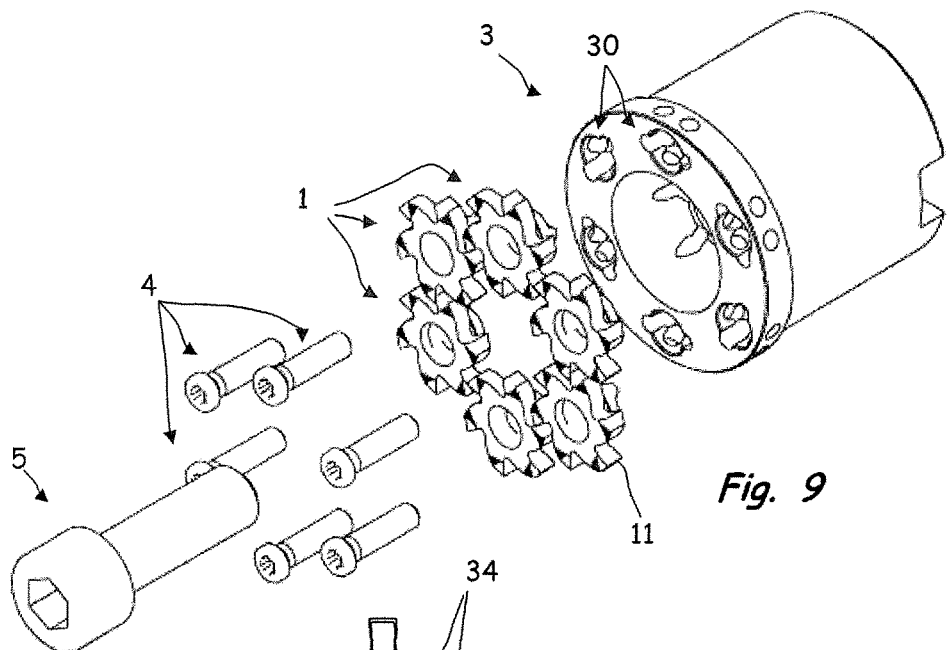
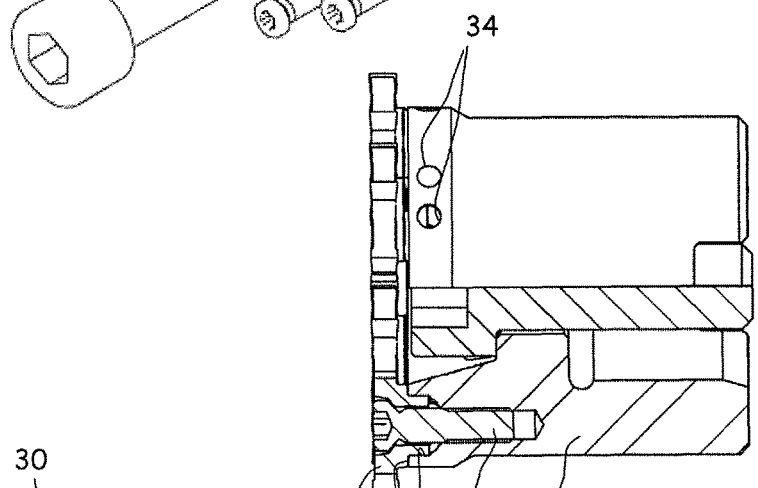
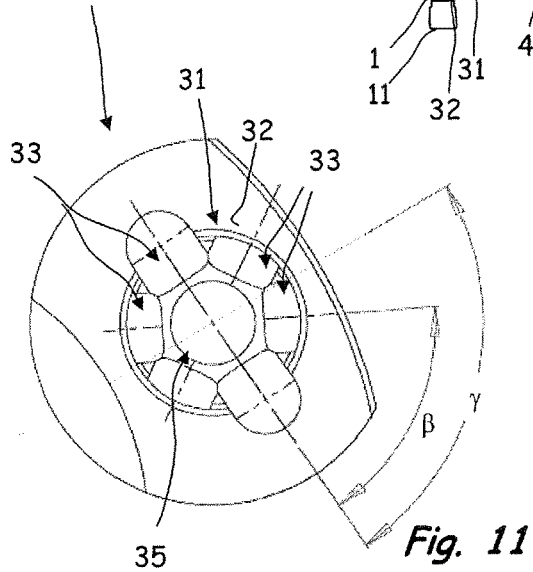
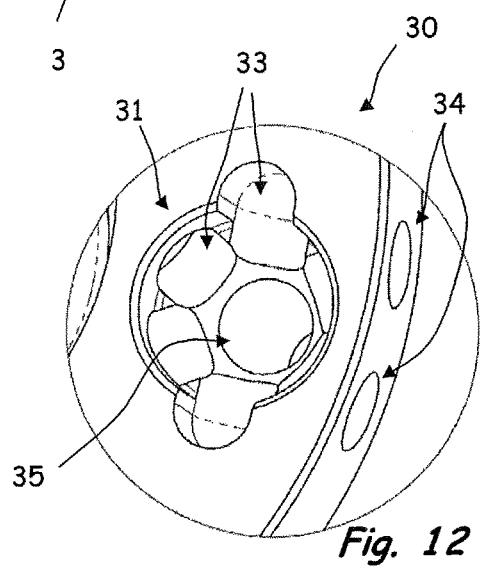
Fig. 9
Fig. 10
Fig. 11
Fig. 12

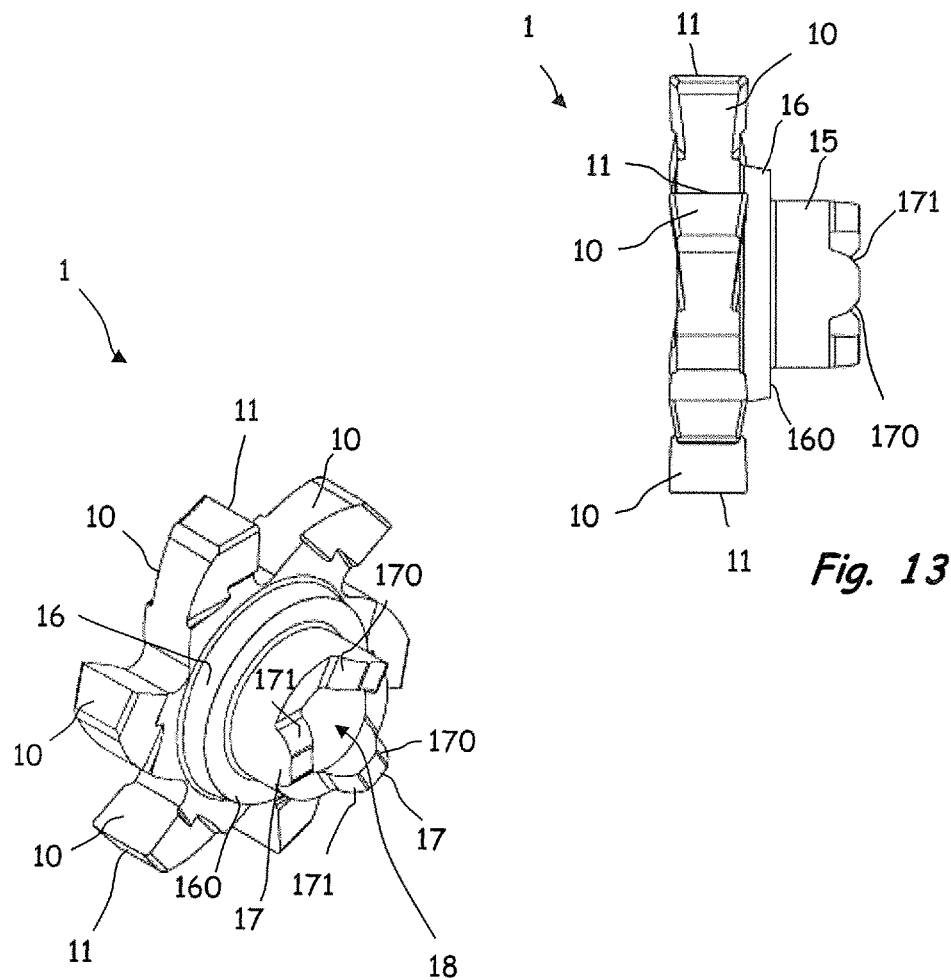
Fig. 13
Fig. 14
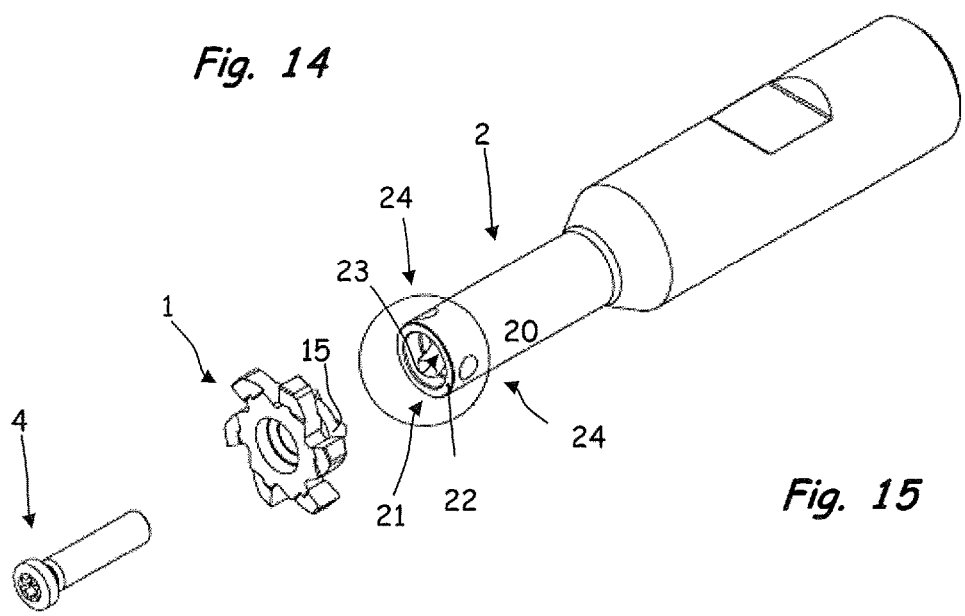
Fig. 15

US 9,919,366 B2

CUTTING INSERT AND A TOOL HOLDER WITH A SEAT FOR CUTTING INSERT

CROSS REFERENCE TO RELATED APPLICATIONS

This application claims priority to EP 13173859.3, filed Jun. 26, 2013, the entire contents of which is hereby incorporated by reference.

The invention relates to a cutting insert and a tool holder with a seat for releasably receiving at least one cutting insert and a milling tool system comprising a holder and a cutting insert.

Milling is a process that requires high accuracy and a maximum rigidity of the milling tool in order to produce high quality profiles and to reduce a cycle time.

Milling tools come in different shapes and sizes depending among others on the application. Milling tools comprising a shank having a seat at the front end and a cutting insert mounted in said seat are known for different applications, including end milling applications, slot milling applications and face milling applications. It is further known to provide a modular cutting tool comprising a shank (also referred to as arbor) and a shell attached to the shank, wherein the shell is provided with one seat or—preferably—several seats for receiving the cutting insert(s). In the context of the application, a shell having at least on seat for receiving a cutting insert and/or a shank having at least on seat for receiving a cutting insert are conjointly referred to as holder.

U.S. Pat. No. 7,153,066 B2 discloses a milling tool comprising a shank having one frontal seat with three grooves therein, and a cutting insert with a central body and at least one cutting tooth projecting radially from said central body mounted in said seat, wherein a coupling structure having at least one driving surface transferring an operating torque from said shaft holding device to said cutting plate is provided at the cutting insert, the coupling structure comprising three ribs projecting axially from said central body, enclosing equal central angles relative to one another, extending radially and being complementary to said grooves in said frontal seat. The ribs and the grooves are provided with a trapezoidal cross-section. In addition, a structural part is provided on the cutting insert, which forms a non-interchangeability mechanism in conjunction with an associated configuration on the seat of the holding device.

It is the object of the invention to provide a cutting insert, a tool holder and a milling tool system comprising a cutting insert and a tool holder, allowing for a coupling of the cutting insert and the tool holder with high accuracy and a maximum rigidity.

This object is solved by cutting insert, the tool holder and the milling tool systems with the features of claims 1, 8, and 16.

According to a first aspect, a cutting insert is provided having a central body, at least one cutting tooth radially projecting from the central body, a central thru hole concentrically arranged with respect to a central axis for receiving a fixing screw, and a coupling structure for coupling the insert to a tool holder and for transmitting a torque from the tool holder to the cutting insert, wherein the coupling structure comprises a circular cylindrical element with a cylinder abutment surface, the circular cylindrical element projecting axially from a bottom surface of the central body and being arranged concentrically with respect to the central axis, a perpendicular abutment surface arranged perpendicular to the central axis, and at least two radially extending ribs projecting axially from the bottom surface each having a contact area with a normal direction at least essentially perpendicular to the central axis for opposing a torque about the central axis.

In one embodiment, the cylinder abutment surface of the circular cylindrical element is a full perimeter abutment surface also referred to as circumferential abutment surface, which abutment surface is not interrupted by the rips.

In preferred embodiments, the cutting insert is arranged for a slot milling application, and the at least one cutting tooth is provided with cutting edge extending parallel to the central axis of the cutting insert. Preferably a plurality of cutting teeth, in particular at least three cutting teeth are provided.

In contrast to the coupling structure of existing systems shown for example in U.S. Pat. No. 7,153,066 B2, the cutting insert according to the application uses distinct features for positioning of the insert in particular in axial direction and transmission of the torque. A precise positioning of the insert in all three axes of a Cartesian reference system is achieved via the cylinder abutment surface and a tightening against a frontal face of a seat using the perpendicular abutment surface. A torque transmission is achieved via the at least two radially extending ribs having a contact area arranged at least essentially in parallel to the central axis. During mounting of the insert to a tool holder, the at least two ribs are received in respective grooves provided at the tool holder, the mounting forces are acting on the perpendicular abutment surface and the load on the ribs is reduced compared to existing systems, preferably no load is acting on the ribs due to the tightening in axial direction.

In a preferred embodiment, the at least two ribs projecting axially from the bottom surface each have a convexly curved flank surface comprising the contact area. Providing convexly curved flank surfaces and respective grooves allows for contact surfaces having a normal direction perpendicular to the central axis without providing a planar surface. In a preferred embodiment, preferably the at least two ribs are each arranged to be received in an at least essentially semicircular groove of a seat with a first radius of curvature, wherein the flank surfaces are bulged toward a contact surface of the groove with a second radius of curvature, which is smaller than the first radius of curvature. In one embodiment, the ribs are provided with a semicircular cross-section. In another embodiment, the ribs are provided with a cross-section in form of a segment defined by cutting a semicircle with a straight line parallel to a base line. When a tightening torque about the central axis is applied to the cutting insert, the flanks will contact the corresponding contact surface of the groove, wherein a normal direction in the contact area is perpendicular to the central axis of the insert. Hence, the design of the flanks allows for an effective balancing of cutting forces acting also perpendicular, wherein a load on the fixing screw compared to existing systems is reduced. This allows the size of the fixing screws to be chosen small.

According to one embodiment, the perpendicular abutment surface is provided at a collar projecting axially from the bottom surface and arranged between the bottom surface and the circular cylindrical element. The collar provides for a clearance between cutting edges provided at sides of the cutting insert and a tool holder.

In preferred embodiments, the at least two ribs and the perpendicular abutment surface are offset in axial direction. Thereby, the full size of the perpendicular abutment surface is used for balancing mounting loads.

In one embodiment, the at least two ribs are provided at a distal end of the circular cylindrical element projecting axially from said distal end. The circular cylindrical element is a hollow cylinder due to the thru hole provided for the fixing screw. Hence, a radial extension of the ribs depends on the wall thickness of the circular cylindrical element. In preferred embodiments, the ribs are symmetrical with respect to a plane containing the central axis allowing for a simple manufacturing thereof.

In preferred embodiments, the at least two ribs enclose equal central angles relative to one another, wherein preferably two ribs are provided which are offset by 180° or more than two ribs are provided which are equally offset by 360°/(number of ribs). For example, three ribs are provided which are offset by 120°.

According to a second aspect, a tool holder having at least one seat with a coupling structure for receiving a cutting insert with a circular cylindrical element having a cylinder abutment surface, a perpendicular abutment surface, and at least two radially extending ribs projecting axially from a bottom surface each having a contact area with a normal direction at least essentially perpendicular to a central axis of the insert for opposing a torque about the central axis is provided, wherein the coupling structure comprises a circular cylindrical recess for receiving the circular cylindrical element of the cutting insert, a perpendicular surface for contacting the perpendicular abutment surface of the cutting insert, and at least two grooves for receiving the at least two ribs projecting of the cutting insert. The tool holder allows for a precise positioning of a complementary cutting insert.

In preferred embodiments, a cross-section of the at least two grooves is at least essentially semicircular with a first radius of curvature. In preferred embodiments, the grooves extend from a bottom surface of the circular recess for receiving ribs projecting from a distal end of the circular cylindrical element of the cutting insert.

In one embodiment, the tool holder is a shank with a frontal seat for mounting of the insert. In preferred embodiments, a cooling channel is provided in the shank.

According to preferred embodiments, the grooves are formed by providing circular holes from an outer surface of the shank. The at least one circular hole extends perpendicular to a longitudinal axis of the shank and parallel to a perpendicular surface provided for contacting the perpendicular abutment surface of the cutting insert. The circular hole intersects the circular cylindrical recess provided in the shank for receiving the circular cylindrical element of the cutting insert for forming a groove with an at least essentially semicircular cross-section at the bottom surface of the circular cylindrical recess.

In an alternative embodiment, the tool holder is a shell with a plurality of frontal seats for mounting a plurality of inserts. In this case, the matching grooves and ribs are not only used for a torque transmission, but also allow for a precise index positioning of the cutting edges of the cutting inserts.

In order to allow an indexing of a cutting insert having a plurality of cutting teeth, each seat is provided with a number of grooves.

In one embodiment, at least some of the grooves are formed by providing circular holes from an outer surface of the shell. The circular holes intersects the circular cylindrical recess provided in the shell for receiving the circular cylindrical element of the cutting insert for forming a groove with an at least essentially semicircular cross-section at the bottom surface of the circular cylindrical recess.

In addition or as alternative, at least some of the grooves are formed by providing recesses from a front surface of the shell.

According to a third aspect, a milling tool system is provided comprising a cutting insert having a first coupling structure and a holder with at least one seat having a complementary second coupling structure, wherein the first coupling structure comprises a circular cylindrical element with a cylinder abutment surface, the circular cylindrical element projecting axially from a bottom surface of the central body and being arranged concentrically with respect to the central axis, a perpendicular abutment surface arranged perpendicular to the central axis, and at least two radially extending ribs projecting axially from the bottom surface each having a contact area with a normal direction at least essentially perpendicular to the central axis for opposing a torque about the central axis, and wherein the second coupling structure comprises a circular cylindrical recess for receiving the circular cylindrical element of the cutting insert, a perpendicular surface for contacting the perpendicular abutment surface of the cutting insert, and at least two grooves for receiving the at least two ribs of the cutting insert.

In the following, an embodiment of the invention will be described in detail based on several schematic drawings in which FIG. 1 is a side view of a first embodiment of a cutting insert;

FIG. 2 is a top view of the cutting insert according to FIG. 1;

FIG. 3 is an isometric view from the bottom of the cutting insert according to FIG. 1;

FIG. 4 is an isometric view of a front end of a first embodiment of a tool holder having a seat for receiving the cutting insert according to FIG. 1;

FIG. 9 is an exploded isometric view of a second embodiment of a milling tool system comprising a tool holder and a plurality of inserts according to FIG. 1;

FIG. 10 is a sectional view of the milling tool system according to FIG. 9;

FIG. 11 is a top view of a detail of the tool holder of the milling tool system according to FIG. 9;

FIG. 12 is an isometric view of the detail of FIG. 11;

FIG. 13 is a side view of a second embodiment of an insert;

FIG. 14 is an isometric view from the bottom of the insert according to FIG. 13;

FIG. 15 is an exploded isometric view of a third embodiment of a milling tool comprising a tool holder and an insert according to FIG. 13;

Throughout the drawings, the same or similar elements will be denoted by the same reference numerals.

FIGS. 1 to 3 show a cutting insert 1 according to a first embodiment, wherein FIG. 1 is a side view, FIG. 2 is a top view, and FIG. 3 is an isometric view from the bottom of the cutting insert 1.

Figure 5:
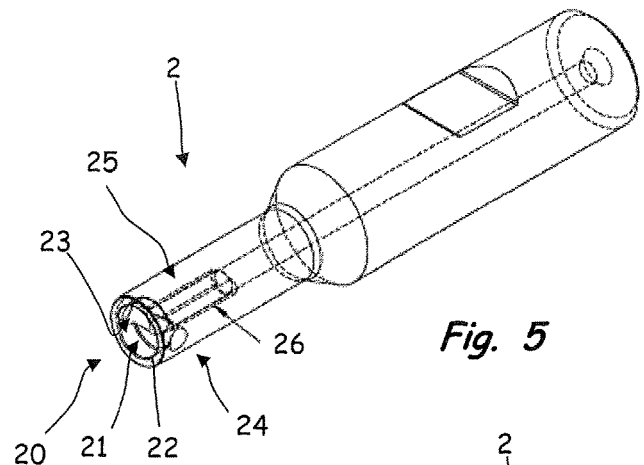
FIG. 5 is an isometric view of the tool holder according to FIG. 4.

The cutting insert 1 is provided with a plurality of peripherally spaced cutting teeth 10 with cutting edges 11. In the embodiment shown, the cutting insert 1 is provided with six cutting teeth 10. The cutting teeth 10 radially project from a central body 12 of the cutting insert 1. The cutting insert 1 shown is a slot milling cutting insert. The cutting edges 11 run in parallel to the central axis A and an envelope curve of the cutting edges 11 is concentrically arranged with respect to the central axis A of the insert 1.

The central body 12 has a bottom surface 13 and a top surface 14. On the bottom surface 13 a coupling structure for coupling the cutting insert 1 to a tool holder (not shown in FIGS. 1 to 3) and for transmitting a torque from the tool holder to the cutting insert 1 is provided.

The coupling structure comprises a circular cylinder element 15 projecting from the bottom surface 13, which is arranged concentrically with respect to the central axis A of the cutting insert 1. In the embodiment shown in FIGS. 1 to 3, the bottom surface 13 is provided with a collar 16 protruding from the bottom surface 13, which collar 16 is arranged between the bottom surface 13 and the circular cylindrical element 15. A perpendicular abutment surface 160 is provided at the collar 16, which perpendicular abutment surface 160 is ring-shaped and arranged perpendicular to the central axis A. A transition region between the collar 16 and the circular cylinder element 15 is provided with a chamfer. The perpendicular abutment surface 160 and a cylinder abutment surface of the circular cylinder element 15 together allow for a precise positioning of the cutting insert 1 in a seat of a holder in axial direction as well as perpendicular to the central axis A.

In the embodiment shown in FIGS. 1 to 3, the coupling structure further comprises two radially extending ribs 17 projecting axially from the bottom surface 13. In the embodiment shown, the ribs 17 are provided with a cross-section in form of a segment defined by cutting a semicircle having a radius R2 with a straight line parallel to a base line of the semicircle. The ribs 17 are symmetrical with two convexly curved flank surfaces 170, 171. In use, the cutting insert 1 is rotated about the central axis A in a rotating direction (counter clockwise in FIG. 2), wherein the convexly curved flank surface 170 facing in opposite direction is used for applying a driving torque and for opposing a torque acting in use on the cutting insert 1 about the central axis A.

The cutting insert 1 is further provided with a thru hole 18 concentrically arranged with respect to the central axis A for receiving a fixing screw (not shown in FIGS. 1 to 3).

FIGS. 4 and 5 schematically show a tool holder 2 with a seat 20 having a second coupling structure, which second coupling structure is complementary to the first coupling structure shown in FIGS. 1 to 3. The tool holder shown in FIGS. 4 and 5 is a shank with a frontal seat 20 for mounting of the cutting insert 1. Only a front end of the tool holder 2 is shown in FIG. 4.

The second coupling structure comprises a circular cylindrical recess 21 for receiving the circular cylindrical element 15 of the cutting insert 1 shown in FIGS. 1 to 3, a perpendicular surface 22 for contacting the perpendicular abutment surface 160 of the cutting insert 1, and two grooves 23 for receiving the two ribs 17 of the cutting insert 1.

In the embodiment shown in FIGS. 4 and 5, the grooves 23 are formed by providing two circular holes 24 with a first radius of curvature R1 from an outer surface of the shank that intersect the circular cylindrical recess 21. A threaded bore 25 is provided concentrically with a longitudinal axis for receiving a fixing screw. In addition, a coolant slot 26 is provided in the shank.

Figure 6:
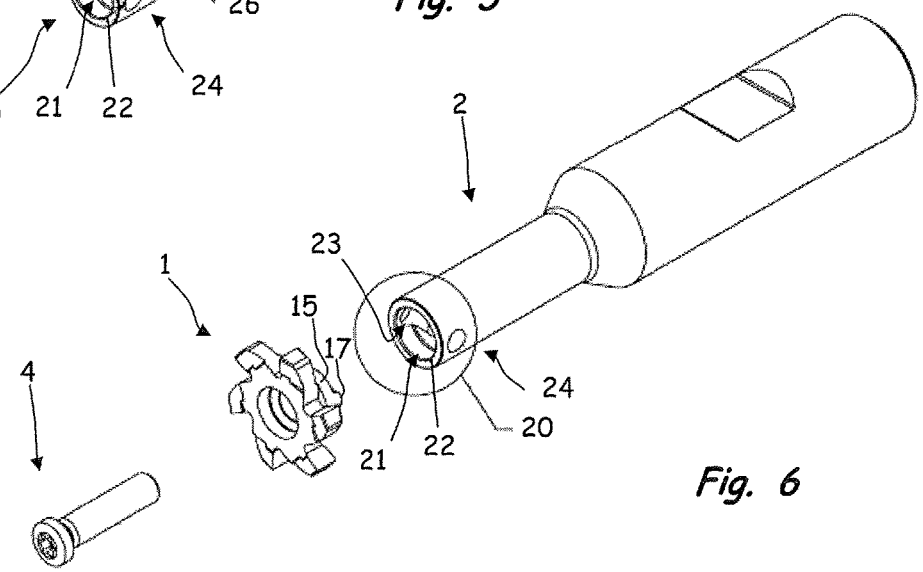
FIG. 6 is an exploded isometric view of a first embodiment of a milling tool system comprising the tool holder according to FIG. 5 and the cutting insert according to FIG. 1.
Figure 7:
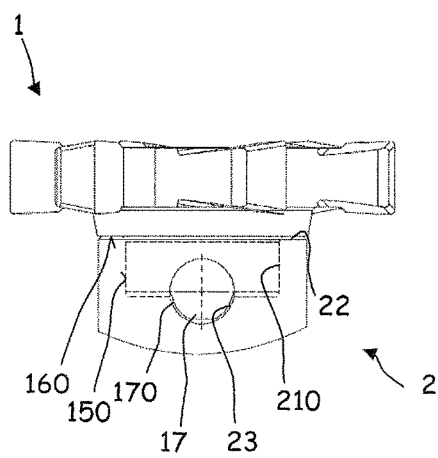
FIG. 7 is detail of a first embodiment of the milling tool system according to FIG. 5 showing the seat and the cutting insert during mounting of the insert.
Figure 8:
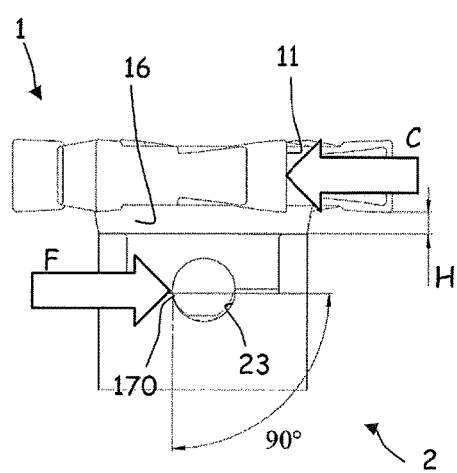
FIG. 8 is the detail of FIG. 7 showing the seat and the cutting insert after the mounting.

FIG. 6 is an exploded isometric view of a milling tool system comprising the tool holder 2 according to FIG. 5 and the cutting insert 1 according to FIGS. 1 to 3. FIG. 7 is detail of the milling tool system shown in FIG. 5 showing the seat 20 of the tool holder 2 and the cutting insert 1 during mounting of the cutting insert 1. FIG. 8 shows the detail of FIG. 7 showing the seat 20 and the cutting insert 1 after mounting the cutting insert 1.

As shown in FIGS. 6 and 7, when mounting the cutting insert 1 to the tool holder 2, the circular cylinder element 15 is received in the circular cylindrical recess 21 of the tool holder 2. The perpendicular abutment surface 160 of the cutting insert 1 provided at the collar 16 contacts the perpendicular surface 22 at the front face of the tool holder 2 surrounding the circular cylindrical recess 21. The ribs 17 are received in the grooves 23. The grooves 23 have an at least essentially semicircular cross-section with a first radius of curvature R1 and the flank surfaces 170 are bulged toward the contact surfaces of the grooves 23 with a second radius of curvature R2, which is smaller than the first radius of curvature R1. Hence, a gap remains between the ribs 17 and an outer surface of the grooves 23. As can be best seen in FIG. 7, the height of the circular cylinder element 15 is slightly less than the depth of the circular cylindrical recess 21 for avoiding a contact of the distal end of the circular cylinder element 15 with the bottom surface of the circular cylindrical recess 21.

After mounting the cutting insert 1, the fixing screw 4 is tightened and the cutting insert 1 is clamped to the tool holder 2. A final locked position of the cutting insert 1 is achieved by applying tightening torque on the fixing screw 4, which also causes the cutting insert 1 and hence the ribs 17 to rotate with respect to grooves 23 on the tool holder 2 until contact.

As shown in FIG. 8, the flanks 170 contact the corresponding contact surface of the groove 23 in a contact area, wherein a normal direction in the contact area is perpendicular to the central axis A of the cutting insert. In use, a driving torque about the central axis A is transmitted to the cutting insert 1 via the ribs 17 when rotating the tool holder 2. A cutting force C is acting on the cutting edges 11 causing a counter torque about the central axis A. The cutting edges 11 shown in FIG. 8 are arranged for a slot milling application and the cutting force C shows a direction perpendicular the central axis A. The cutting force C does not provoke any force in the direction of the cutting axis A. As the normal direction in the contact area is at least essentially perpendicular to the central axis A of the cutting insert, a frictional force is acting against a movement along the central axis A. However, no load is exerted on the fixing screw 4. Therefore, compared with existing milling tool systems, smaller fixing screws 4 may be used.

As shown in FIG. 8, the height H of the collar 16 defines the distance between the front end of the tool holder 2 and the cutting edges 11. The height H is chosen small, wherein a rigidity of the tool system is increased as the contact areas are located closer to the cutting forces.

Due to an increased system stability, the proposed coupling structure can also be used in face milling applications.

FIGS. 9 and 10 are an exploded isometric view and a section view of a second embodiment of a milling tool system comprising a tool holder 3 and a plurality of inserts 1 according to FIG. 1. A detail of the tool holder 3 showing a seat 30 is shown in FIGS. 11 and 12, wherein FIG. 11 is a top view and FIG. 12 is an isometric view.

The tool holder shown in FIGS. 9 to 12 is a shell with a plurality of frontal seats 30 for mounting a plurality of cutting inserts 1. Each cutting insert 1 is fixed to the respective seat 30 using a fixing screw 4. Further, a central screw 5 is provided for fixing the shell to a shank (not shown).

In the embodiment shown in FIGS. 9 to 12, six seats 30 for mounting six inserts 1 are provided. In other milling tool systems more or less than six inserts 1 are mounted, wherein the number of effective cutting edges 11 coincides with the number of mounted cutting inserts 1. The seats 30 are evenly distributed in circumferential direction. The milling tool system shown allows for short cutting times by utilizing a large cutting tool with a plurality of effective cutting edges.

Each seat 30 has a second coupling structure, which second coupling structure is complementary to the first coupling structure of the insert shown in FIGS. 1 to 3. The second coupling structure of each seat 30 comprises a circular cylindrical recess 31 for receiving the circular cylindrical element 15 of the cutting insert 1, and a perpendicular surface 32 for contacting the perpendicular abutment surface 160 of the cutting insert 1. A front surface of the shell functions as the perpendicular surface 32. The cylindrical recess 31 and the perpendicular surface 32 together allow for a precise positioning in axial direction. In addition, six grooves 33 for selectively receiving the two ribs 17 of the cutting insert 1 are provided. The grooves 33 are provided at a bottom surface of the cylindrical recess 31 and have an at least essentially semicircular cross-section. A bottom surface of the cylindrical recess 31 is provided with inclined walls for avoiding a contact at the bottom of the cylindrical recess 31 with a distal end of the circular cylindrical element 15 of the cutting insert 1.

The cutting insert 1 is indexable in the seat 30, wherein the ribs 17 are inserted in two of the grooves 33 allowing for a precise positioning of the cutting edge 11 used. The cutting insert 1 is provided with six cutting edges 11. The two ribs 17 of the cutting insert 1 shown in FIGS. 1 to 3 are offset by 180°. The seat 30 comprises six grooves 23 enclosing equal angles of β=60° allowing to selectively present one of the six cutting edges 11.

In the depicted embodiment, two grooves 23 enclosing an angle γ with a radial direction are formed by providing recesses from a front surface of the shell. The remaining four grooves are formed by providing two circular holes 34 from an outer surface of the shell, which circular holes 34 intersect the cylindrical recess 31.

A threaded bore 35 is provided concentrically with the cylindrical recess 31 for receiving the fixing screws 4 and fixing the inserts 1 in axial direction. The cutting insert 1 shown in FIGS. 1 to 3 is provided with two ribs 17 each having a contact area for opposing a torque about the central axis A of the insert. As clamping forces when tightening the fixing screw 4 are acting on the perpendicular surface 160 of the insert 1, the load on the ribs 17 is kept low. In order to further reduce the load per rib 17, in one embodiment the number of ribs is increased.

FIGS. 13 and 14 show a side view and an isometric view of a second embodiment of a cutting insert 1 provided with three ribs 17. The three ribs 17 of the insert shown in FIGS. 13 and 14 enclose equal angles of 120°. Apart from the number of ribs 17, the cutting insert 1 shown in FIGS. 13 and 14 are identical to the cutting insert 1 shown in FIGS. 1 to 3. For a detailed description of the features, reference is made to the description of FIGS. 1 to 3.

The cutting insert 1 with the three ribs 17 can be mounted to the tool holder 3 shown in FIGS. 9 to 12 having six grooves 33, wherein selectively one of the six cutting edges 11 of the cutting insert 1 is presented.

In alternative, the cutting insert 1 having the first coupling structure comprising three ribs 17 can be mounted to a tool holder in the form of a shank provided with a complementary second coupling structure. FIG. 15 shows in an exploded isometric view of a milling tool system comprising a tool holder 2 in the form of a shank and a cutting insert 1 according to FIG. 13. The tool holder 2 shown in FIG. 15 is similar to the tool holder 2 shown in FIGS. 4 to 6.

The second coupling structure provided at the seat 20 of the tool holder 2 shown in FIG. 15 comprises a circular cylindrical recess 21 for receiving the circular cylindrical element 15 of the cutting insert 1 shown in FIGS. 13 and 14, a perpendicular surface 22 for contacting the perpendicular abutment surface 160 of the cutting insert 1, and three grooves 23 for receiving the three ribs 17 of the cutting insert 1.

In the embodiment shown in FIG. 15, the three grooves 23 are formed by providing three circular holes 24 with a first radius of curvature R1 from an outer surface of the shank that intersect the circular cylindrical recess 21. A threaded bore (not visible in FIG. 15) is provided concentrically with a longitudinal axis for receiving the fixing screw 4.

Figure 16:
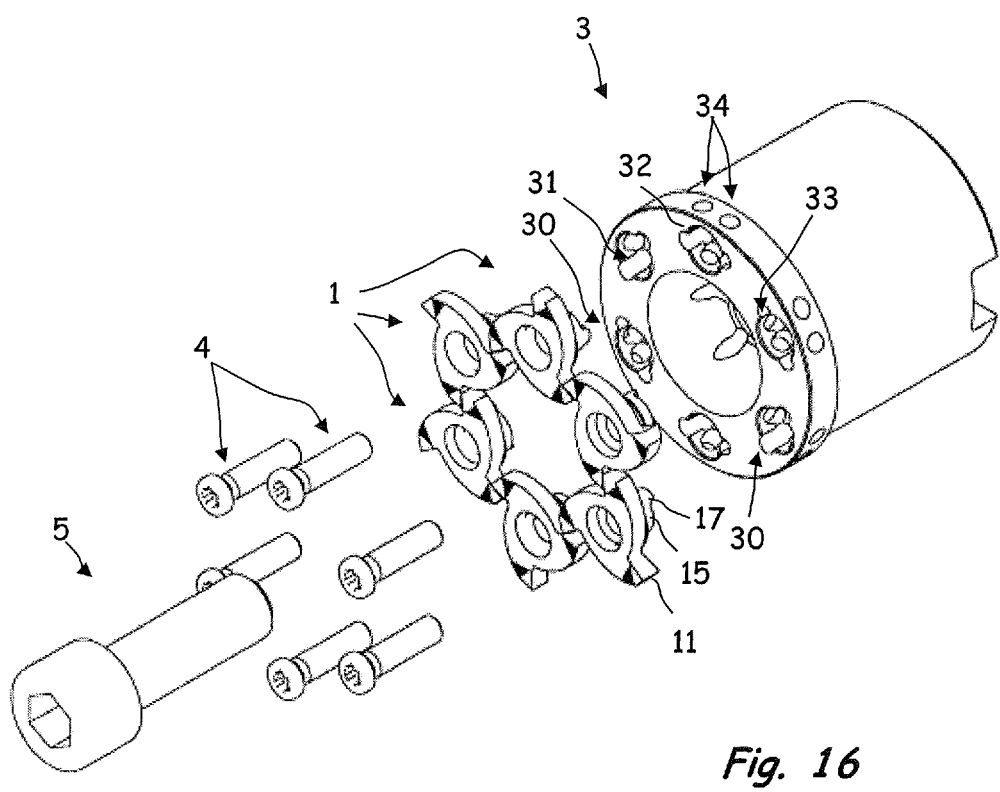
FIG. 16 is an exploded isometric view of a forth embodiment of a milling tool comprising a tool holder and a plurality of inserts.

FIG. 16 is an exploded isometric view of another embodiment of a milling tool system comprising a tool holder 3 and a plurality of inserts 1. The tool holder 3 shown in FIG. 16 is a shell with a plurality of frontal seats 30 for mounting a plurality of cutting inserts 1. In the depicted embodiment, six seats 30 for mounting six inserts 1 are provided.

The tool holder 3 and the cutting inserts 1 are provided with complementary coupling structures.

The coupling structures of the inserts 1 each comprise a circular cylindrical element 15 with a cylinder abutment surface, a (non-visible) perpendicular abutment surface arranged perpendicular to the central axis, and two ribs 17. The complementary second coupling structures of the seats 30 each comprise a circular cylindrical recess 31 for receiving the circular cylindrical element 15 of the cutting insert 1, a perpendicular surface 32 for contacting the perpendicular abutment surface of the cutting insert 1, and several grooves provided at the bottom of the circular cylindrical recess 31 for selectively receiving the at two ribs 17 of the cutting insert 1. In the depicted embodiment, six grooves are formed, wherein four grooves are formed by providing circular holes 34 intersecting the circular cylindrical recess 31.

The cutting inserts 1 shown in FIG. 16 differ from the cutting inserts shown in FIGS. 1 to 3 in that only three cutting edges 11 are provided which are selectively presented when mounting the indexable cutting insert 1 to the shell. The use of three cutting edges 11 allows to increase the cutting depth for slot milling applications.

Figure 17:
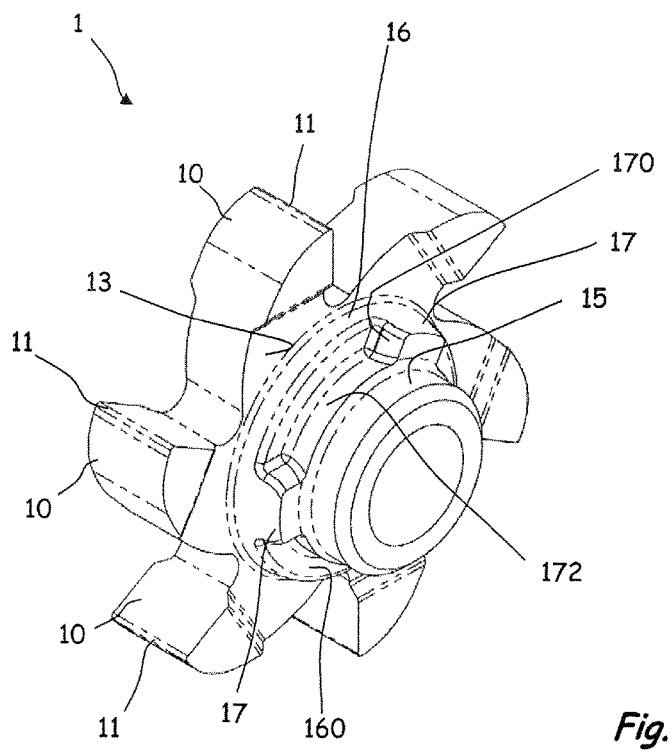
FIG. 17 is an isometric view from the bottom of a third embodiment of an insert.

FIG. 17 shows an isometric view from the back of a further embodiment of a cutting insert 1 similar to that of FIGS. 13 and 14. The cutting insert 1 shown in FIG. 17 is also provided with a plurality of peripherally spaced cutting teeth 10 with cutting edges 11. As with the embodiments described above, on the bottom surface 13 a coupling structure for coupling the cutting insert 1 to a tool holder (shown in FIG. 18) and for transmitting a torque from the tool holder to the cutting insert 1 is provided.

The coupling structure comprises a circular cylinder element 15 projecting from the bottom surface 13, which is arranged concentrically with respect to the central axis A of the cutting insert 1. In the embodiment shown in FIG. 17, the bottom surface 13 is also provided with a collar 16 protruding from the bottom surface 13, which collar 16 is arranged between the bottom surface 13 and the circular cylindrical element 15. A perpendicular abutment surface 160 is provided at the collar 16, which perpendicular abutment surface 160 is ring-shaped and arranged perpendicular to the central axis A. The coupling structure comprises further three ribs 17 arranged evenly distributed about the periphery of the circular cylinder element 15.

In contrast to the embodiment shown in FIGS. 13 and 14, the three ribs 17 of the insert 1 shown in FIG. 17 do not protrude from the distal end of the circular cylindrical element 15. Instead, the ribs 17 protrude from the perpendicular surface 160 of the collar 16 and are arranged at the periphery of the collar. With this arrangement, as with the arrangement shown in FIGS. 13 and 14, the cylinder abutment surface is a full perimeter or circumferential abutment surface, which is not interrupted be the ribs 17. The ribs 17 are also provided have with convexly curved flank surfaces 170 for transmitting a torque. Arch-shaped portions 172 provided between the ribs 17 function as release surfaces.

Figure 18:
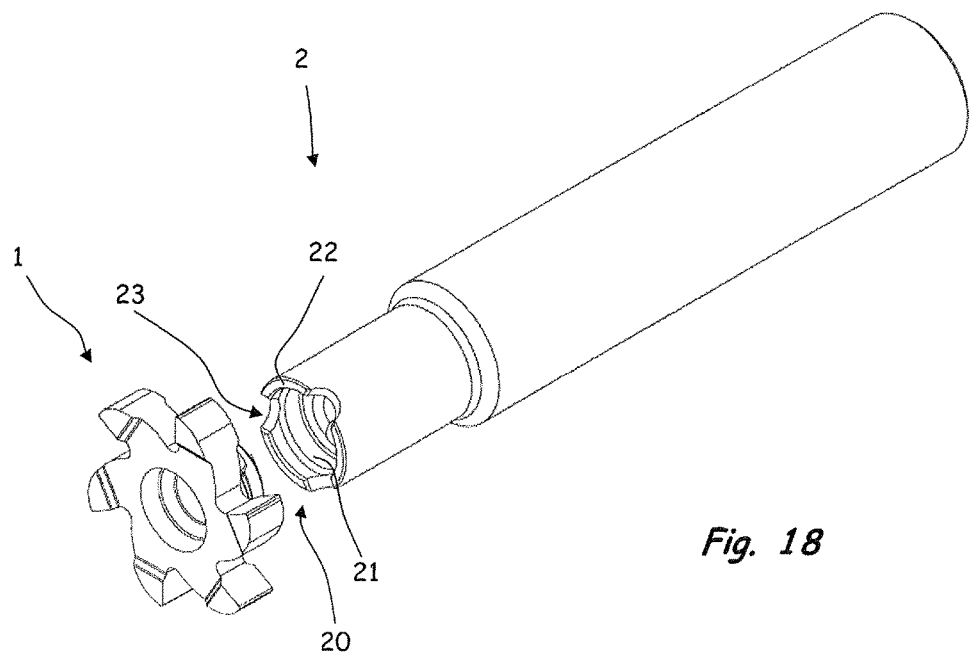
FIG. 18 is an exploded isometric view of a fifth embodiment of a milling tool comprising a tool holder and an insert according to FIG. 17.

As shown in FIG. 18, the cutting insert 1 having the coupling structure shown in FIG. 17 comprising three ribs 17 protruding from the perpendicular abutment surface 160 can be mounted to a tool holder in the form of a shank provided with a complementary second coupling structure. FIG. 18 shows in an exploded isometric view a milling tool system comprising a tool holder 2 in the form of a shank and a cutting insert 1 according to FIG. 17. The tool holder 2 shown in FIG. 15 is similar to the tool holder 2 shown in FIGS. 4 to 6.

The second coupling structure provided at the seat 20 of the tool holder 2 shown in FIG. 18 comprises a circular cylindrical recess 21 for receiving the circular cylindrical element 15 of the cutting insert 1 shown in FIG. 17, a perpendicular surface 22 for contacting the perpendicular abutment surface 160 of the cutting insert 1, and three grooves 23 for receiving the three ribs 17 of the cutting insert 1. In the embodiment shown in FIG. 18, the three grooves 23 are formed by providing three semi-circular cut-outs at the distal end of the tool holder 2.

In an alternative embodiment (not shown), the cutting insert 1 with the three ribs 17 is mounted to a tool holder similar to that shown in FIGS. 9 to 12 having six grooves 33, wherein selectively one of the six cutting edges 11 of the cutting insert 1 is presented.

The invention claimed is:

1. A cutting insert having a central body, at least one cutting tooth radially projecting from the central body, a central thru hole concentrically arranged with respect to a central axis (A) for receiving a fixing screw, and a coupling structure for coupling the insert to a tool holder and for transmitting a torque from the tool holder to the cutting insert, wherein the coupling structure comprises
  a circular cylindrical element with a cylinder abutment surface, the circular cylindrical element projecting axially from a bottom surface of the central body and being arranged concentrically with respect to the central axis (A),
  a perpendicular abutment surface arranged perpendicular to the central axis (A), and
  at least two radially extending ribs projecting axially from the perpendicular abutment surface each having a contact area with a normal direction at least essentially perpendicular to the central axis (A) for opposing a torque about the central axis (A); and
  wherein the cylindrical abutment surface of the circular cylindrical element is a full perimeter abutment surface, which is not interrupted by the ribs.

2. The cutting insert according to claim 1, wherein the at least two ribs each have a convexly curved flank surface comprising the contact area, wherein preferably the at least two ribs are each arranged to be received in a groove of a seat having an at least essentially semicircular cross-section with a first radius of curvature (R1) and each flank surfaces is bulged toward a contact surface of the respective groove with a second radius of curvature (R2), which is smaller than the first radius of curvature (R1).

3. The cutting insert according to claim 1, wherein the perpendicular abutment surface is provided at a collar projecting axially from the bottom surface and arranged between the bottom surface and the circular cylindrical element.

4. The cutting insert according to claim 1, wherein at least two ribs enclose equal central angles relative to one another.

5. The cutting insert according to claim 4, wherein two ribs are provided, the ribs being equally offset from one another by a circumferential angular interval of 180°.

6. The cutting insert according to claim 4, wherein more than two ribs are provided, the ribs being equally offset from one another by a circumferential angular interval of 360° divided by the number of ribs.

7. A tool holder having at least one seat with a coupling structure for receiving a cutting insert according to claim 1, wherein the coupling structure comprises:
  a circular cylindrical recess for receiving the circular cylindrical element of the cutting insert,
  a perpendicular surface for contacting the perpendicular abutment surface of the cutting insert, and
  at least two grooves for receiving the at least two ribs of the cutting insert.

8. The tool holder according to claim 7, wherein a cross-section of the at least two grooves is at least essentially semicircular with a first radius of curvature (R1).

9. The tool holder according to claim 7, wherein the tool holder is a shank with a frontal seat for mounting of the cutting insert.

10. The tool holder according to claim 9, wherein the grooves are formed by providing circular holes from an outer surface of the shank.

11. The tool holder according to claim 7, wherein the tool holder is a shell with a plurality of frontal seats for mounting a plurality of cutting inserts.

12. The tool holder according to claim 7, wherein each seat is provided with a number of grooves allowing for an indexing of the insert.

13. The tool holder according to claim 7, wherein at least some of the grooves are formed by providing circular holes from an outer surface of the shell.

14. The tool holder according to claim 7, wherein at least some of the grooves are formed by providing recesses from a front surface of the shell.

15. A milling tool system comprising a cutting insert according to claim 1 having a first coupling structure and a holder according to claim 7 with at least one seat having a complementary second coupling structure.

\* \* \* \* \*